Oct. 12, 1948. M. V. GROVES 2,451,334
FLUID PRESSSURE OPERATED ACTUATING DEVICE
Filed June 17, 1943 5 Sheets-Sheet 5
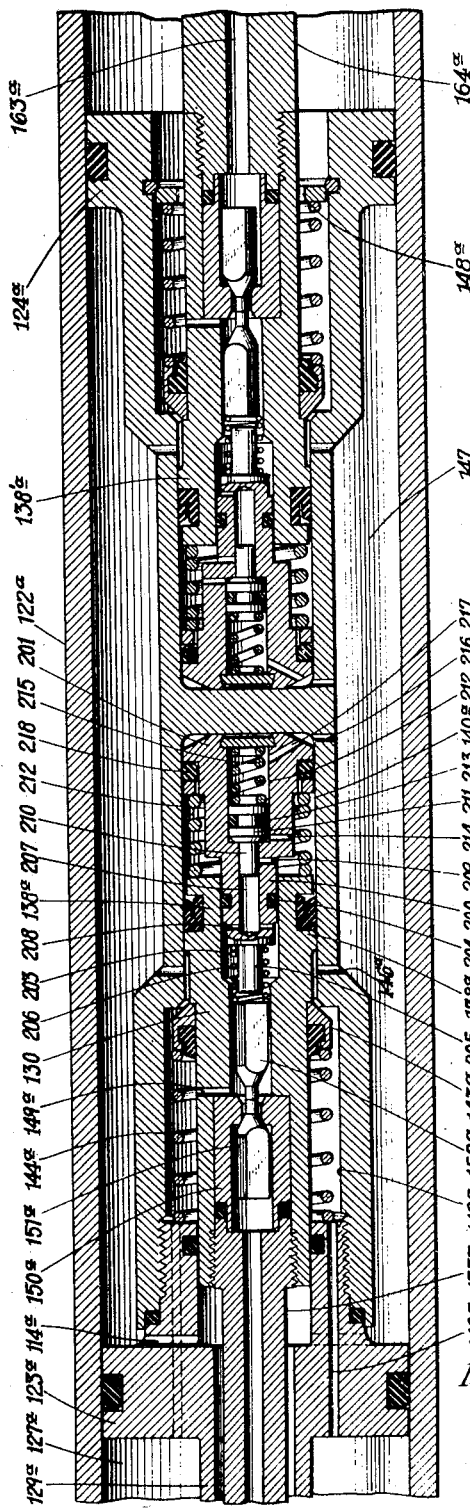
INVENTOR.
MARTIN V. GROVES.
BY
his ATTORNEYS.

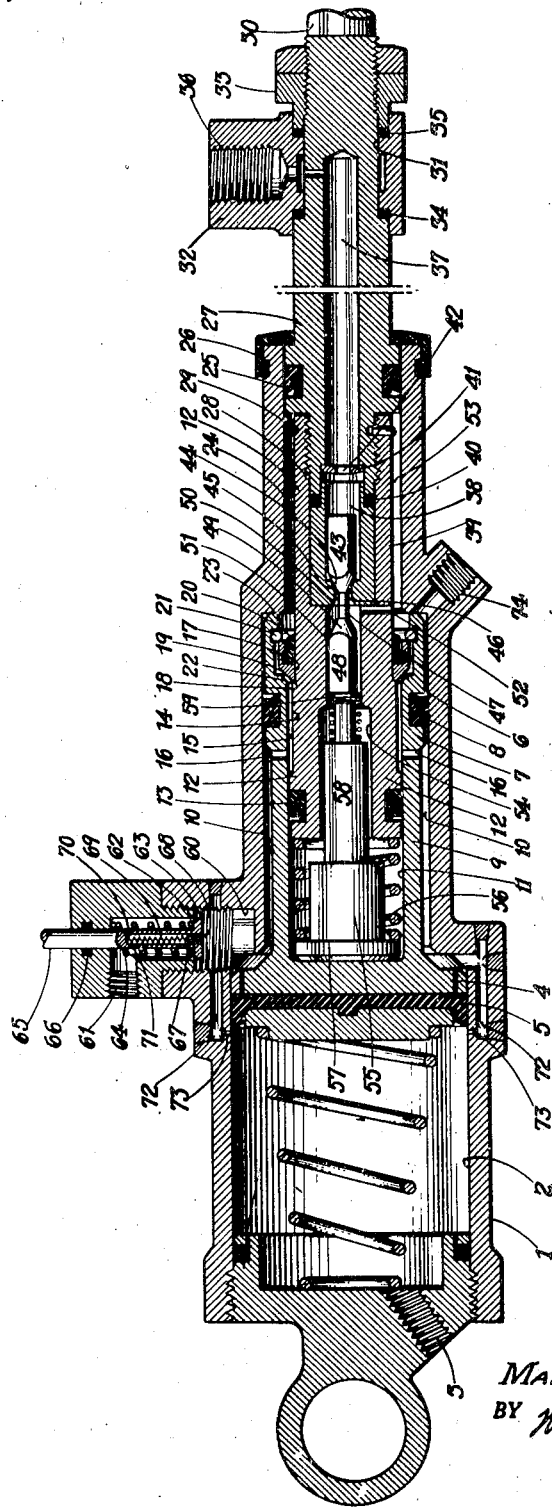

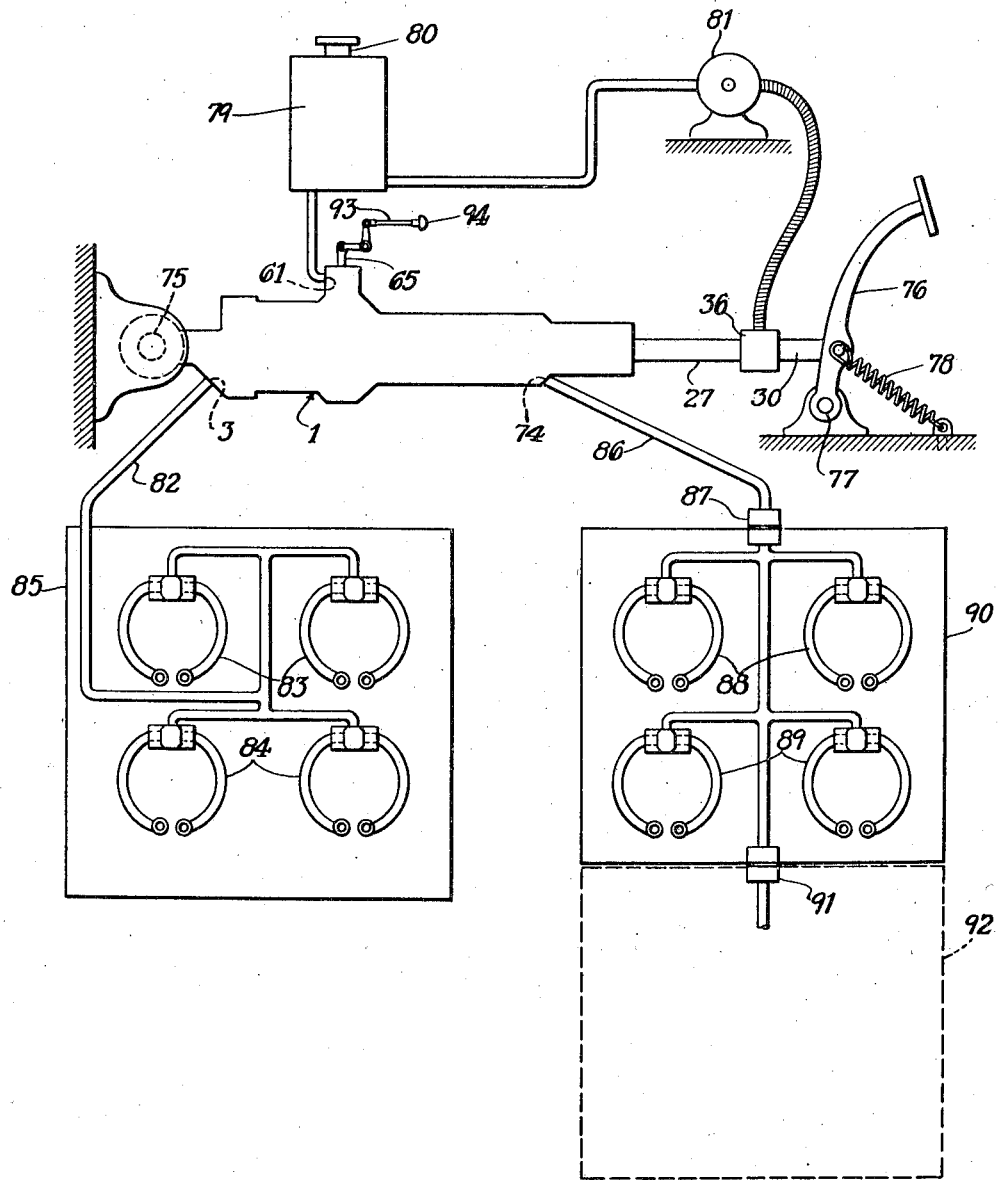

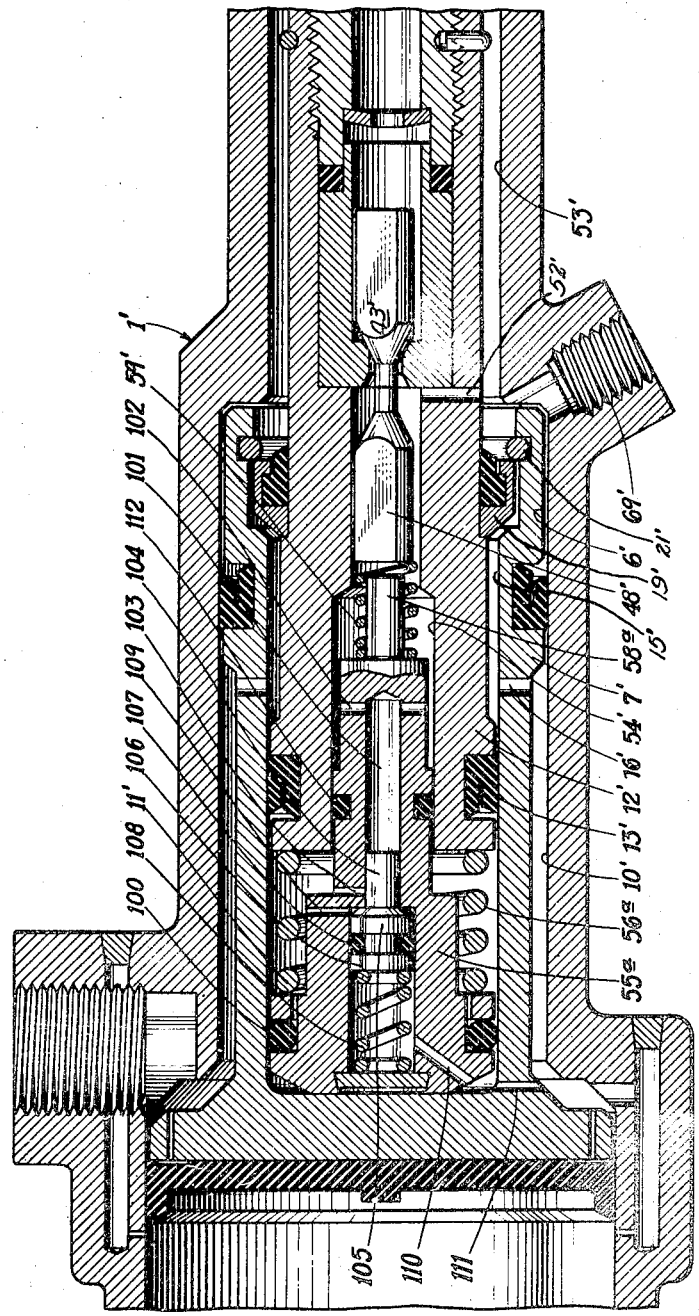

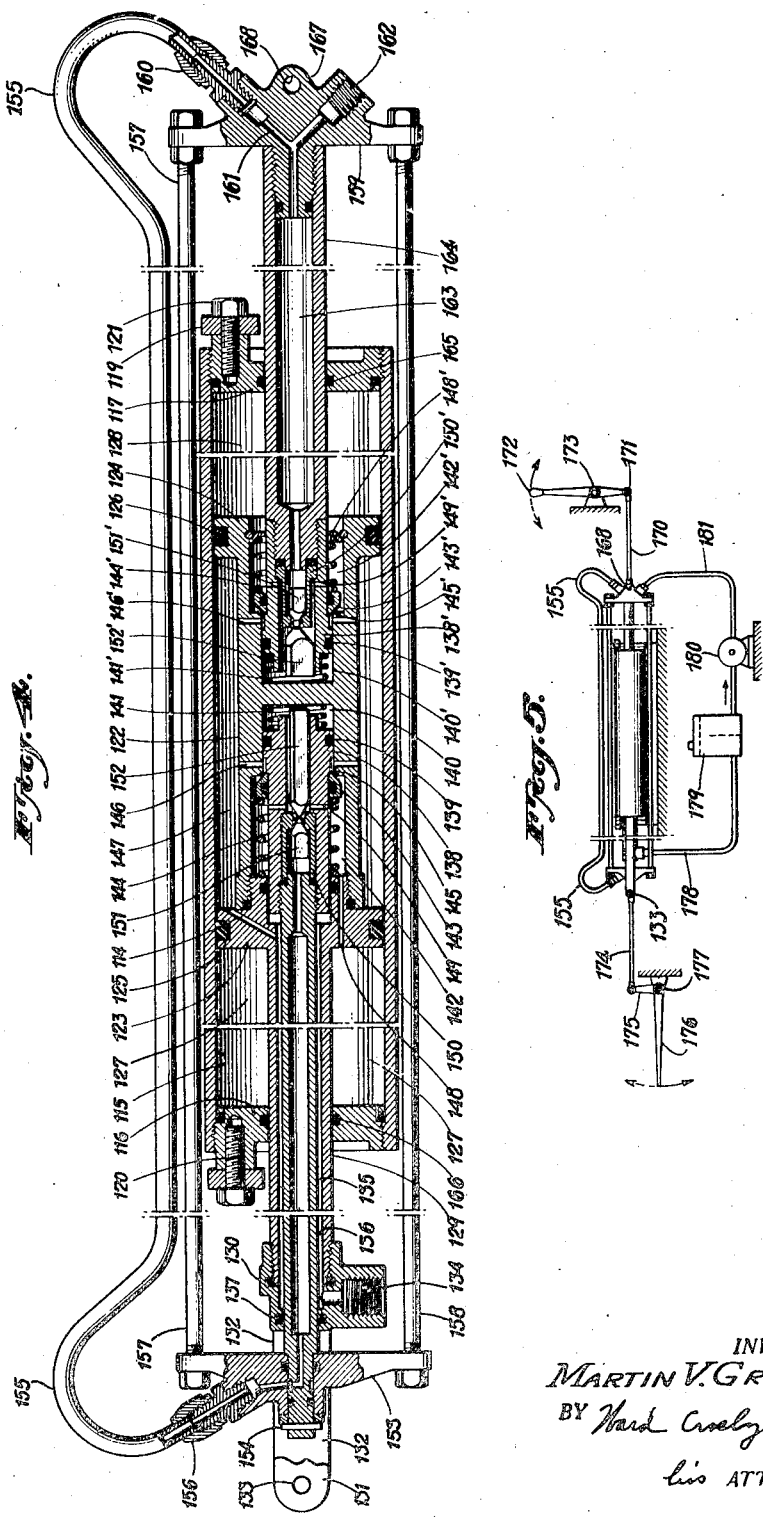

Patented Oct. 12, 1948

2,451,334

UNITED STATES PATENT OFFICE 2,451,334

FLUID PRESSURE OPERATED ACTUATING DEVICE

Martin V. Groves, Brooklyn, N. Y., assignor of one-half to Arthur Wilde and Arthur Hull-Ryde, both of Bayside, N. Y., jointly Application June 17, 1943, Serial No. 491,181

19 Claims. (Cl. 60—54.5)

This invention relates to fluid pressure systems and actuators therefor, and more particularly to such devices employing supplemental fluid under pressure.

In my Patent No. 2,179,241, issued November 7, 1939, for "Compound hydraulic brake pump", and in my copending application Serial No. 366,333, filed November 20, 1940, for "Compound hydraulic brake compressor," and issued as Patent No. 2,343,900 on March 14, 1944, I have disclosed hydraulic actuating mechanisms of the type in which the manual actuation first supplies a large volume displacement and thereafter a relatively low volume displacement which creates a hydraulic advantage due to the difference in area between the low pressure and high pressure pistons. In certain installations, however, where there is available a fluid pressure line, it is desirable to utilize the fluid from such pressure line. For example, in aircraft, high pressure fluid lines are utilized for the operation of gun turrets, wing flaps, landing gears, gun loaders, etc., and in such uses the pressure is supplied by a suitable hydraulic pump. Such high pressure systems have been utilized in the actuation of brakes on airplanes; but such use has not been entirely satisfactory due, among other things, to the fact that: there is no "feel," i. e., when the manually controlled part (such as a brake pedal) is moved to operative position by the pilot, there is no responsive action to indicate to the pilot the operative position of the brake; and there is difficulty in properly metering the fluid supplied by the high pressure line, and fluctuations in such power supply cause inconvenient fluctuations in the brake mechanism. These and other difficulties are also presented in the application of such high pressure systems to two-way actuation of such parts as ailerons or rudders.

Likewise in utilizing hydraulic actuators, such as manually operated compressors or master cylinders, for automotive land vehicles, such as trucks used in conjunction with towed vehicles, such as trailers, it is desirable to control the braking of the main and the drawn units from a common control means; and difficulties have been experienced in such use due to the great difference in volumetric requirements when the main vehicle is used alone and when one or more drawn units are attached.

An object of this invention is to provide an actuating device utilizing supplemental fluid supplied from a pressure fluid line, such as by a power pump, without the detriments above indicated.

Another object of the invention is to provide a device in which the actuating pressure is supplied by manual actuation of the device and in which the relatively large volume displacement is supplied by the fluid pressure line under the control of manual actuation.

Another object of the invention is to provide a device in which there are two stages of fluid pressure produced by manual actuation and in which the supplemental pressure fluid supply is utilized during one of said stages.

Another object of the invention is to provide a single master actuating unit adapted to actuate fluid systems employing main and auxiliary units desired to be actuated but having different volumetric requirements.

Another object of the invention is to provide a device capable of being actuated by fluid suitably supplied, such as by a pressure pump, under the manual control of the operator while at the same time providing means which may be entirely manually operated in the event of failure of the power-supplied fluid.

Another object of the invention is to provide a device which is equally well adaptable to one-way or to two-way control.

The invention lends itself to great flexibility of use over a wide range. For example, while it is desirable to use hydraulic fluid as the actuating medium in view of the compactness of the resulting structure, the several features of the invention are equally well adaptable for the utilization of a gaseous fluid medium, but of course in such event certain of the parts will have to be increased in size.

The invention is not only adaptable to deliver power in one direction, such as in the application of brakes and the like; but is also adaptable to deliver power in two directions, such as in the actuation of steering mechanisms or the operation of airplane vertical and horizontal rudders and ailerons, the steering of heavy vehicles, such as buses, trucks and ships, etc.

Furthermore, certain features of the invention may be usefully employed for power actuation only, under manual control while providing positional control during the range of movement of the manually operable part; or this feature may be coupled with direct manual actuation, or with compound hydraulic manual actuation, or with two-stage manual hydraulic actuation.

The invention consists in the novel features, arrangements and combination of parts embodied by way of example in the apparatus hereinafter described as illustrating the preferred form of the invention, and the invention will be more particularly pointed out in the appended claims.

Further objects, features and advantages of the invention will more clearly appear from the detailed description given below taken in connection with the accompanying drawings which form a part of the specification.

Referring to the drawings:

Fig. 1 is a longitudinal cross-sectional view of an embodiment of the invention adapted for one-way actuation;

Fig. 2 is a somewhat schematic view illustrating the use of the device of Fig. 1 as applied to the actuation of main and auxiliary units;

Fig. 3 is a longitudinal cross-sectional view of a portion of a device similar to that of Fig. 1 but showing certain modifications thereof;

Fig. 4 is a longitudinal cross-sectional view of an embodiment of the invention adapted for two-way actuation;

Fig. 5 is a somewhat schematic view illustrating the use of the device of Fig. 4 as applied to the actuation of an aircraft rudder; and Fig. 6 is a longitudinal cross-sectional view of a portion of the device similar to that of Fig. 4 but showing certain modifications thereof.

One-way actuator

Referring to Fig. 1, a main body is designated 1 comprising a main cylinder 2 provided with an outlet opening 3 adapted to communicate fluid from the cylinder 2 to the hydraulic line interconnected to the motor or motors to be actuated. A main piston 4, comprising a sealing cup 5, is disposed within the cylinder 2. The body 1 is also provided with a cylinder bore 6 which is in communication with the cylinder 2, and in which is disposed a booster piston 7 comprising a sealing cup 8; the piston 7 is formed integrally with the piston 4 providing therebetween a sleeve portion 9 whose external diameter is smaller than the diameter of the cylinder 6 to provide therebetween an annular passage 10 and whose internal diameter provides a compounding cylinder 11 in which is disposed a compounding piston 12 comprising a sealing cup 13. The piston 12, rearwardly of the cup 13, has a reduced portion 14 between which and the cylinder 11 there is provided an annular passage 15 which communicates with the annular passage 10 through a plurality of passages, such as 16. The piston 12 is provided with a further reduced portion 17 which provides a shoulder 18 against which is positioned a valve ring 19 which has a seal 20 disposed between it and the piston 12. A lock ring 21 is seated in the rear end of the piston 7 and serves to limit the rearward movement of the valve ring 19. A valve seat 22 is provided on the piston 7 for cooperative engagement with the valve ring 19.

The bore 6 terminates at a shoulder 23 which serves a a rearward stop for the piston 7; and the bore 6 is in communication with a concentric smaller bore 24. The piston 12 is provided with a rear head comprising a sealing cup 25 in sealing engagement with the bore 24, and serves to form the rear closure of a fluid chamber to the rear of the piston 7 comprising portions of the bores 6 and 24. A dust cap 26 is suitably fastened to the rear end of the body 1 and surrounds the piston rod 27 of the piston 12. In the present embodiment, the piston rod 27 and piston 12 are made in two pieces for purposes of assembly, and are secured together by threaded connections 28 and are locked in assembled position by a lock ring 29.

The rear end 30 of the piston rod 27 provides an extended end for engagement with suitable actuating means. The rod 27 is provided with a reduced portion 31 which is surrounded by a suitable swivel fitting 32 which is secured in position by a suitable nut 33, and sealing rings 34 and 35 are utilized for sealing the fitting 32 to the rod 27. The fitting 32 is provided with a threaded bore 36 adapted to be attached to a pressure fluid line through which it is adapted to be supplied by suitable means, such as a pump. The bore 36 is in liquid communication with an axial bore 37 in the rod 27. The bore 37 is in liquid communication with an interior bore 38 formed in a valve body 39 which is in sealed communication within the piston 12 by means of a sealing ring 40. A stop washer 41 is disposed rearwardly of the valve body 39 and is provided with an opening 42 to provide for fluid passage therethrough. A metering valve, such as the needle valve 43, is slidably positioned within the bore 38 and is provided with a conical portion 44 adapted to be seated on a cooperating valve seat 45, the needle valve body 43 being triangular in cross-section to provide means for suitably centering the valve within the bore 38 while at the same time permitting passage of fluid past the valve seat 45 when the valve is open. The valve 43 is provided with a stem 46 which is adapted to be engaged by an actuating stem 47 which forms a part of a needle valve 48 which is provided with a conical valve portion 49 adapted to be seated on the valve seat 50. The valve 48 is likewise provided with a triangular cross-section so as to slidably journal it within a bore 51 provided in the piston 12 and permit fluid to pass through the bore 51 by the body of the valve 48. A transversely extending passage 52 places the bore 51 in communication with an annular chamber 53 provided between the bore 24 and the piston 12 and therefore in communication with the booster cylinder 6.

The bore 51 is also in communication with a coaxial bore 54 formed in the piston 12 and in communication with the compounding cylinder 11.

A valve actuating pin 55 is seated against the forward end of the cylinder 11 and is held in position by a helical spring 56 disposed between the pin head 57 and the forward end of the piston 12. The rear end of pin 55 terminates in a reduced portion 58 which is spaced in predetermined distance from the forward end of the valve 48 and a helical spring 59 resiliently holds the valve 48 in such spaced position. The normal space between the valve 48 and the pin end 58 is slightly greater than the distance between the valve ring 19 and its cooperating seat 22; and in the present embodiment the space between the valve 48 and the pin end 58 is $\frac{1}{16}$", while the distance between the valve members 19 and 22 is $\frac{1}{32}$".

The body 1 is provided with a chamber 60 in communication with the cylinder 2 and the annular passage 10. The chamber 60 is provided with a passage whose outer opening is threaded as at 61 for communication with a suitable fluid reservoir and whose inner end is provided with a valve seat 62 adapted to be closed by a cooperating valve 63 normally held in open position by suitable means, such as the helical spring 64, surrounding the valve stem 65 which is surrounded by a sealing ring 66 through which it passes so as to be engaged by suitable actuating means. In order to take care of excessive temperature variations, or abnormal expansion in the system when the valve 63 is closed, a suitable relief valve is preferably provided. This valve may conveniently take the form of a check ball valve 67 held against a valve seat 68 by means of a helical spring 69 disposed within the valve stem passage 70, the upper end of which communicates through a port 71 with the outlet 61. The valve seat 68 is provided with a central opening which places the chamber 60 in communication with the outlet 61; so that when the valve 63 is closed, and upon a predetermined pressure having been reached in the chamber 60, the ball valve is raised from its seat and fluid is permitted to pass upwardly through the stem 65 and out through the port 71 into the outlet 61 until the pressure drop causes the ball check to close. The chamber 60 is also in communication with the cylinder 2 forward of the sealing cup 5 by means of suitable passages 72 and port openings 73 which are adapted to be closed as the main piston 4 advances.

Where it is desired to acutate one or more auxiliary units in addition to one or more main units, I have discovered that such auxiliary devices may be entirely satisfactorily handled by fluid connection to the annular chamber 53, and also to the booster cylinder 6 by way of a threaded opening 74 provided in the body 1, in the manner to be more particularly pointed out hereinafter. Where such auxiliary connections are not utilized, the outlet 74 may be provided with a suitable plug.

Referring more particularly to Fig 2, the unit above described with reference to Fig. 1 is shown somewhat diagrammatically in a system employing main means to be actuated and auxiliary means to be actuated. The installation taken by way of illustration is applied to a truck and two trailer units drawn thereby. The body 1 of the actuating unit is pivotally attached, as at 75, to a frame portion, and the operating end 30 of the rod 27 is pivotally secured to an actuating member, such as a brake pedal 76, pivotally supported as at 77, and preferably held in "off" position by means of a spring 78. A suitable fluid reservoir 79, provided with a vent 80, is connected to the outlet 61 and is also connected to the inlet side of a suitable power-driven pump, such as 81, the outlet of which is in liquid communication with the pressure line inlet 36 of the master cylinder. The hydraulic fluid outlet 3 is in communication with a main brake hydraulic line 82, which in the present embodiment is shown as supplying braking fluid under pressure to a pair of front brakes 83 and rear brakes 84 of a truck designated as 85 which carries the actuating mechanism above described. The auxiliary outlet 69 is connected to an auxiliary hydraulic line 86 connected by means of a coupling connector and valve unit 87 with one or more sets of brakes, such as 88—89, of a trailer unit designated as 90. The auxiliary hydraulic line may further be connected by means of a coupling and valve unit 91 with one or more additional trailer units, indicated as 92. The stem 65 of the "parking" brake valve 63 is connected to suitable actuating means 93—94 for holding the valve closed when it is desired to lock the brakes in applied position.

*Operation of one-way actuator*

With the parts in their normal "off" position, the hydraulic system supplied with fluid, and the power pump 81 supplying pressure through the line opening 36 into the passage 37 of the master cylinder, the operation of the apparatus is as follows: Upon the application of pressure to the pedal 76 by the operator, the rod 27 is moved forwardly carrying with it the compounding piston 12 which displaces fluid from the cylinder 11 through the passage 54 and the openings 52 into the booster chamber 53. As soon as the piston 12 moves forward a small increment, the valve ring 19 engages its seat 22 to thereby close the chamber 53, so that fluid from the compounding cylinder 11 drives the piston 7 forward under hydraulic advantage, which in the present embodiment, in view of the difference in the areas of the pistons 12 and 7, takes the form of a hydraulic compounding of pressure, carrying with it the piston 4 whose sealing cup 5 closes the bleeder passages 73 and thereafter transmits actuation pressure through the medium of the fluid which is thereby passed from the cylinder 2 through the opening 3 into the hydraulic line 82 and thence to the hydraulic motors of the brakes, such as 83—84. This manual stage of the operation continues only during the initial increment of movement of the piston 7 and until the relative pressure compounding or telescoping movement between the pistons 12 and 7 causes the pin end 58 to engage the body of the valve 48 whose stem 47, through driving engagement with the stem 46, moves the conical valve portion 44 away from its seat 45, thereby permitting fluid under pressure from the pump 81 to pass from the passage 37 outwardly through the openings 52 into the chamber 53 to thereby supply displacement fluid behind the piston 7 to move it forwardly. At this time, the pressure fluid from the pump 81 is likewise in communication, through the passage 54, with the compounding cylinder 11 and thereby exerts a reaction on the piston 12 in a direction opposite to the manual pressure exerted on the piston 12 from the brake pedal 76, and this reactionary force is accordingly transmitted directly to the brake pedal and the operator's foot. This provides the much desired "feel" which enables the operator to maintain a sensitive control over the hydraulic actuation even though a relatively high pressure fluid is supplied, as by a power pump. It is to be noted that the force exerted on the piston 4 is no greater when the power-supplied fluid is admitted to chamber 53 than is the force exerted solely by fluid displaced from the cylinder 11 into chamber 53 manually by the operator; but the supplemental fluid furnished by the pump is of a volume greater than that which could be displaced from the small cylinder 11. It will therefore be seen that the action of the operator after power actuation commences is largely a follow-up movement resulting in positional control. It is also noted that in normal operation the valve 43 begins to open before the inner end of the piston 12 has moved sufficiently to come into contact with the enlarged end 55 of the rod 56 and therefore the hydraulic advantage is maintained between the pistons 12 and 7 even though the necessary volume of fluid displacement is supplied by the pump. In order to facilitate a ready understanding of this feature of the invention the space between said piston and adjacent portion of the enlargement 55 is shown somewhat exaggerated in Fig. 1 (and also in Fig. 3).

As soon as the valve 43 is opened, as above described, the pressure fluid is likewise supplied through opening 74 into the auxiliary line 86 to apply the brakes, such as 88—89, of the trailer units, such as 90—92. Considering the relatively faster movement of the compounding piston 12 with respect to that of the piston 7 and the main piston 4, and the relative sizes of the cylinder 6 and the cylinder 2, it will be understood that the main and auxiliary brakes may be readily adjusted so that the auxiliary brakes on the trailer units, such as 90—92, are applied simultaneously with, or even slightly before (in accordance with optimum practice) the application of the brakes of the truck 85.

As soon as the operator releases the brake pedal 76, the small piston 12 moves rearwardly with respect to the large piston 7, which causes a relative forward movement of the pin 55—58 with respect to the piston 12; and the valve 43 is thereby released from the open position and is moved to closed position by the fluid pressure in the passage 37. Immediately upon the closing of the valve 43, the brake system is instantaneously still under manual operation until further release by the operator of the brake pedal 76. It will be understood that the valve 43 provides a very sensitive metering device; so that if the brake is gradually applied by the operator, it gradually successively passes through the stages of manual actuation and the power actuation very gradually takes effect due to the slight opening of the valve 43 relative to the large fluid displacement necessary for the system as a whole: but if, on the other hand, very quick and forceful actuation is desirable and the operator pushes the brake rapidly and forcibly, the valve 43 may be quickly unseated to a relatively large opening with resultant quick and positive actuation, which will neverthless be remarkably smooth in its passage from compound hydraulic manual actuation to power actuation. The system has been found to be quite dependable and practical in operation while at the same time furnishing braking "feel" and positional follow-up of the brake pedal.

It is likewise to be noted that the operation remains entirely smooth and no appreciable operative change is apparent through wide fluctuations of the pressure of the fluid supplied by the pump 81. Fluctuations of pressure have been varied as much as 70% or more without any noticeable effect in operation and without being noticeable by the operator in using the invention for actuation of airplane brakes. If, for any reason, the power pressure should fail, the device may still be actuated by manual pressure by the the operator since the compound hydraulic pressure will be equally supplied to the main and auxiliary brakes, it being noted, however, that the length of stroke of piston 12 and cylinder 11 will have to be proportional to the displacement volume of the system. In such an event, the fluid displaced by the piston 11 is prevented from escaping into the passage 37 by the provision of the second valve 48, which, upon release of pressure in the passage 37 and the rearward movement of the valve 43, permits the seating of the valve 51 on its seat 50 to thereby close the passage 37 from the chamber 53. Also, valve 48 serves to prevent sudden increase of pedal effort if the brake is applied and the hydraulic system fails. It also prevents draining of the system should the power line break or fail. Likewise, even if there should be an additional failure, in very exceptional cases, due to leakage such as would prevent hydraulic compounding as between the pistons 12 and 7, or if the displacement stroke of piston 12 is not long enough to provide compounding; nevertheless the forward end of piston 12 upon its extreme forward movement in its cylinder 11 will engage the enlarged portion of pin 55 and will thereby be in positive driving engagement with piston 4; so that in this extreme emergency at least a direct manual brake actuation is available.

Upon release of the brake, the parts are returned to their normal position as follows: The valve 43 is seated, the spring 56 returns the piston 12 rearwardly with respect to the piston 7, the shoulder 18 on the piston 12 unseats the valve ring 19 from its seat 12 and the fluid from the chamber 53 passes through the valve 19—22 into the annular passage 15, through the passage 16 into the annular passage 10 and through the chamber 60, thence through the outlet 61 into the reservoir 79, it being understood that the piston 4 is returned by its retractile spring, the rearward movement of the piston 7 is limited by the shoulder 23 and the rearward movement of the piston 12 is limited by the lock ring 21.

*Two-stage manual operation of one-way actuator*

In some cases, it is desirable to have two stages of manual actuation in normal operation, and in such case a staging valve may be provided between the pistons 12 and 7 so that upon the initial actuation, these pistons are hydraulically locked together to be moved as a unit until a predetermined pressure is attained, and thereafter a second or compounding stage is reached and the power actuation is effected during the second stage in the manner previously described. In Fig. 3 I have shown a device similar to that shown in Fig. 1 and in which, for ready comparison, identical parts are designated by the same numerals to which have been applied the prime suffix, and corresponding parts which vary somewhat from those in Fig. 1, but function in the same manner, are designated with the same numerals to which have been applied the suffix $a$. Except for the differences to be pointed out following, the modification of Fig. 3 is the same as that of Fig. 1. Instead of the valve pin 55—58 of Fig. 1, this modification employs a valve pin designated 55$a$—58$a$ whose lower end is provided with a sealing ring 100 in sealing engagement with the cylinder 11'. The pin 55$a$ is provided with an axial fluid passage 101 whose rear end is placed in communication with the bore 54' by means of passages 102 and whose intermediate portion is provided with an outwardly extending passage 103 placing it in communication with the cylinder 11', and which latter passage is normally closed by a valve pin 104 which is integrally formed with a valve head 105 disposed within an enlarged bore 106 in which it is slidably disposed and in sealing engagement by means of a sealing ring 107. The valve 104—105 is normally held in closed position by means of a helical spring 108 and is adapted to be opened by predetermined pressure applied to the head 105 through a port 109 in communication with the cylinder 11'. The bore 106 is vented to the annular space 10' by means of passages 110—111. The pin 55$a$ carries a sealing ring 112 making sealing contact with the bore 54', to prevent leakage of fluid from the cylinder 11' into the bore 54' when the valve 104 is closed.

It will therefore be understood that with this modification, upon initial application of the brake, the staging valve 104 is closed and the fluid is trapped ahead of the piston 12' within the cylinder 11'. Upon initial movement the pistons 12' and 7' are hydraulically locked together and as they move inwardly fluid passes from the reservoir through ports 16' into the annular passage 15' and past the valve ring 19' and its locking ring 21' into the chamber 53'. The locking ring 21' is not a continuous circle but (as is well known to those skilled in the art) is so formed as to permit passage of fluid thereby; for example, by having alternate or spaced apart segments offset from the main diameter. The piston 12' is moved unitarily with the piston 7' until such time as a predetermined pressure has been reached and this pressure is exerted through port 109 on the head 105 to thereby drive it forward and cause the valve portion 104 to uncover the port 103 and permit fluid to flow therethrough into the passage 101, out through the ports 102 and outwardly through the bore 54' and ports 52' into the chamber 53'; whereupon the compounding or second stage of manual operation commences, and from then on the device actuates as previously described with respect to Fig. 1. For example, after the valve 105 has opened the passage 103 to release the hydraulic lock between the pistons 12' and 7' the small piston 12' moves forward relative to the large piston 7' and fluid is displaced from between the pistons past valve 48' and to the rear of valve 19' and piston 7', so that at this stage of operation there is no necessity to take liquid rearwardly past the ring valve 19'; and as soon as piston 12' telescopes further in piston 7' the pressure fluid valve 43' is opened by movement of the plunger 48' and pressure fluid is supplied.

While in the previous embodiments, the actuating force is transmitted by fluid medium displaced by the piston member 4 from the hydraulic cylinder 2, it will of course be understood by those skilled in the art that the movement of the member 4 may equally well be utilized to transmit power to a brake or other unit to be actuated by means of direct mechanical connections between the member 4 and the unit to be actuated.

In the foregoing embodiments, the invention has been illustrated in its use in one-way actuation, i. e., in applying force in one direction, suitable retractile means serving to return the part to its neutral position. The invention is also applicable to two-way actuation, i. e., in applying force in relatively opposite directions, while still maintaining "feel" directional and positional control. Such an embodiment will now be illustrated.

*Two-way actuator*

Referring more particularly to Fig. 4, a cylinder body is designated as 115 and is provided with oppositely disposed cylinder heads 116—117 suitably secured thereto in fluid-tight relationship and serving to mount the cylinder 115 on relatively stationary lugs 118—119 by suitable means such as the screws 120—121. A double acting piston 122 is slidably disposed within the cylinder 115, and is provided with oppositely disposed cylinder heads 123—124 in fluid-tight engagement with the cylinder walls as by means of sealing rings 125—126, thereby providing between the piston heads 123—124 and their respectively cooperating cylinder heads 116—117 fluid chambers 127—128. The piston 122 is provided with a hollow piston rod 129 which extends outwardly to the left and provided with an end cap 130 rigidly secured thereto and forming a continuation thereof. The outer end of the cap is formed with bifurcations 131—132 provided with a pin or bolt hole 133 for attaching the piston rod to a part to be actuated. The cap 130 is provided with a threaded opening 134 serving as a means for attaching thereto a conduit connection with a fluid reservoir which is thereby placed in communication with the interior of the hollow piston 129. A hollow plunger 135 is telescopically disposed within the rod 129 so as to provide therebetween an annular passage 136 which is in communication with the outlet 134 and is thereby adapted to communicate with the fluid reservoir. The interior of rod 129 is in fluid sealing engagement with the exterior of plunger 135 by means of a sealing ring 137 carried by the cap 130. The inner end of plunger 135 is provided with a piston end 138 having a piston sealing ring 139 in cooperative sealing engagement with a cylinder 140 formed by the inner end of an axial bore provided in the piston 122, and the helical spring 141 serves to yieldably hold the piston 138 in spaced relation with respect to the head of its cylinder 140. The outer end of piston 138 is disposed within a larger bore 142 and a valve ring 143 is disposed within said bore surrounding said piston and held against a shoulder provided thereon by means of a helical spring 144. The valve ring 143 has a corresponding valve seat 145 adjacent the inner end of the large bore 142 and adapted to control the passage of fluid from the bore 142 into ports 146 in communication with an annular chamber 147 provided between the piston 122 and the cylinder 115 intermediate the piston heads 123—124 and in communication with the interior of the piston rod 129 by means of a passage 114. The bore 142 is likewise in communication with the cylinder chamber 127 by means of a passage or passages such as 148. The piston 138 is provided with an axial bore extending therethrough in continuation of the interior of the plunger 135 and is in fluid communication with the bore 142 by means of radial passages, such as 149, and opens at its inner end into cylinder 140. A valve body 150 is suitably rigidly secured within the piston bore and provides oppositely disposed seats for the valve member 151, which is carried within the valve body 150, and for the valve member 152 which is disposed within the bore of the piston 138. The valve members 151—152 are triangular in cross-section so as to slidably center the valves in their respective bores while permitting the passage of fluid through said bores when the valves are open. The valves 151 and 152 in general correspond to the valves 43 and 48 previously described in connection with Fig. 1.

The outer end of the plunger 135 is rigidly secured to a cross-piece 153 which passes freely between the bifurcations 131—132 and is held against a shoulder on the said plunger by suitable means, such as a pin 154. The cross-piece 153 is provided with suitable fluid passage means serving to place the interior of the plunger 135 in communication with a pressure fluid tube 155 suitably secured to the cross-head 153 as by a compression coupling 156.

The cross-head 153 carries rigidly secured thereto tie-rods 157—158 which are in threaded engagement therewith and provided with suitable cooperating lock nuts. These tie-rods pass to the right exteriorly of the cylinder 115 and are suitably rigidly secured to a second cross-head 159. The cross-head 159 is provided with a suitable three-branch fluid passage 161, one branch of which is in communication with the tube 155 whose adjacent end is suitably secured thereto by a compression coupling 160. A threaded inlet opening 162 on the terminal end of another branch serves as a means of attachment of a fluid pressure line adapted to be supplied with fluid under pressure as by means of a suitable power-driven motor. The third of said branches is in communication with an axial bore 163 provided in a plunger 164 rigidly secured at its outer end to the cross-head 159 and corresponding in general to the oppositely disposed plunger 135 above described. The inner end of the plunger 164 is provided with a piston end, valve means, and other related structure similar in arrangement and function with the parts previously described in connection with the plunger 135, and in order to avoid a repetition of description of these parts, they will be given the same numbers as those previously described with the added prime suffix. The plunger 164 and the main piston rod 129 pass respectively through the cylinder heads 117 and 116 with respect to which they are placed in fluid sealing engagement by means of the sealing rings 165—166. The cross-head 159 is provided with an engageable portion 167 having a clevis pin or bolt hole 168 by which it may be suitably connected to an operating part such as a control lever, pedal or the like manually movable part.

By way of illustrating the operation of the two-way actuator just described, I have illustrated in Fig. 5, somewhat schematically, an arrangement in which the two-way actuator illustrated in Fig. 4 is employed for the purpose of operating a rudder, such as the horizontal rudder or elevator of an aircraft. Referring more particularly to Fig. 5, the actuation unit is attached at the operator's end to a control rod 170 to which the engageable portion 167 (Fig. 4) is pivotally attached by means of a pin inserted in the hole 168. The control rod 170, either directly or through suitable intermediate linkage, is pivotally connected at 171 to the lower end of a control lever 172 which is pivotally supported, as at 173 from a fixed part of the airplane, for movement to the left and right (as indicated by the arrows). The engageable portion 131 of the unit (i. e., the actuating end of the piston rod 129) is connected to a control rod 174 as by means of a pin passing through the hole 133, and the other end of the rod 174 is pivotally connected, either directly or through suitable intermediate linkage, to a control arm or member, such as 175, rigidly secured to the horizontal rudder or elevator 176 pivotally mounted as at 177 to a relatively rigid part of the airplane. The fluid supply opening 134 communicates by way of a flexible conduit such as 178 with a suitable reservoir 179 which is in communication with the inlet side of a power pump 180 whose outlet is in communication, by way of a flexible conduit 181, with the pressure fluid inlet 162 (Fig. 4). The unit is suitably supported from a relatively stationary part of the airplane by means of the supporting lugs 118—119 (Fig. 4). The operation of the two-way actuator will now be described with reference to its use as illustrated in Fig. 5. In this use, it is to be understood that as the operator pushes the control lever 172 forward in the direction of the solid arrow, it is desired that the elevator 176 move downward in the direction of the solid arrow to thereby lift the tail of the airplane to bring about the desired directional control, and vice versa, movement of the control lever 172 in the direction of the dotted arrow will cause the elevator 176 to move in the direction of the dotted arrow. It is to be understood, however, that this embodiment is purely illustrative of the two-way actuation of a member by means of the unit disclosed in Fig. 4.

*Operation of two-way actuator*

With the system supplied with fluid from the reservoir 179 and with the pump 180 suitably driven, and with the parts as indicated in the drawings (Figs. 4 and 5), the operation takes place as follows: Upon forward movement of the control lever 172, the lower end 171 moves rearwardly, thus imparting through the rod 170 a manual force delivered to the plunger 164 (Fig. 4), which causes the plunger to move to the left and moves its piston end 138' toward the bottom of its cylinder 140' against the action of spring 141'. As soon as the movement of the piston end causes the valve ring 143' to seat upon its valve seat 145', the fluid, which is displaced from the cylinder 140', passes outwardly through ports 149', the passage 142', the passage 148' and into the cylinder chamber 128; thus delivering a hydraulic compound pressure against the piston head 124 to urge the piston 122 to the left, in the same direction in which the engageable end 167 is manually moved. The piston 138' being of smaller diameter than the piston head 124, has a forward movement relative to the piston 122; so that upon continued movement of the piston 138', the valve 152' engages the valve 151' to lift it from its seat and permit fluid to pass from the axial opening 163 in the plunger 164, past the valve 151' and outwardly through the ports 149', through the bore 142' and passage 148' into the cylinder chamber 128, to thereby supply actuating fluid under pressure to drive the piston 122 to the left in the same direction in which it was previously moving. As the piston 122 moves to the left, with respect to its cylinder 115 which is relatively anchored, actuating force is delivered by its outwardly extending end 131 to the rod 174 (Fig. 5) and this motion is transmitted to the elevator 176 to cause it to move downwardly in the direction of the solid arrow. During this operation, the movement of the cross-head 159 to the left is transmitted by the tie-rods 157—158 so as to carry along with it the cross-head 153 and the oppositely disposed plunger 135 so that said plunger is maintained in its neutral position with respect to the piston 122 and therefore at any time during the actuation of the device to the left as above described the parts are in such position that a reverse movement by the operator immediately takes effect; thereby providing the desired directional and positional control.

During this operation of the device to the left, the operator is provided with the "feel" in exactly the same manner as that previously described in connection with Figs. 1 and 2, and likewise the power actuation from the pump 180 exerts a reactive force which is imparted to the operator through the control lever 172 and the power actuation only continues so long as the operator continues to exert operative pressure to counteract said reaction. When the force exerted by the operator ceases to counteract this reaction, the piston 138' moves to the right relative to the piston 122 and this causes the valve 151' to close, thereby shutting off the pressure fluid from the pump 180, but at that instant still maintains the device under manual actuation through the compound hydraulic connection between the pistons 138' and 122. However, upon further decrease in the operative force, the valve ring 143' is raised from its seat 145' and at that time the pistons 138' and 122 are only connected by means of the spring 141'. As in the previously described one-way embodiment, in the event of failure of the pressure fluid supply, the valve 152' is closed by fluid pressure in the cylinder 140' and the device may then be actuated manually by the compound hydraulic fluid connection above described; and further in the event that this connection should fail or when the bottom of the piston 138' reaches the bottom of its cylinder 140', the piston 122 may then be directly mechanically driven by continued forward movement of the plunger 164, or the position of the parts as they then are may be maintained in that position to the extent that the operator can supply the necessary force manually. These safety provisions are especially desirable in steering operations, and more particularly so in aircraft.

In any position, whether from neutral or after actuation to the left as above described, the reverse actuation can be simularly brought about by movement of the control lever 172 rearwardly in the direction of the dotted arrow. For instance, starting with the parts at rest where the elevator 176 has been moved downwardly; upon the operator moving the control lever 172 in the position of the dotted arrow, the power fluid will first be shut off from the cylinder chamber 128, the compound hydraulic coupling will be disconnected between the pistons 138' and 122 and the piston 138' will move back to its neutral position and at that time the plunger 135 will commence its inward movement delivering a predetermined pressure through the spring 141 to the piston 122 and thereafter closing the valve ring 143 against its seat 145 so as to deliver compound hydraulic fluid pressure to the cylinder chamber 127 for a further limited movement of the plunger 135 to the right until the valve 151 has been opened by the valve 152, at which time the fluid under pressure will pass through the ports 149, the bore 142 and the passage 148 into the cylinder chamber 127 to thereby furnish pressure fluid to continue the movement of the piston 122 to the right and bring about the resultant movement of the elevator 176 in the direction of the dotted arrow.

From the foregoing, it will be seen that in any position of the control lever 172, the elevator 176 is at all times under manual directional and positional control of the operator, and at all times the operator has a very definite and sensitive "feel" of the elevator. It is further noted that an important feature of the invention (particularly as applied to aircraft) is that at any time during the operation, if the operator releases the pressure from the control lever 172, the elevator 176 is permitted to return to its position of aerodynamic balance (which may or may not be its central position). This is made possible by the fact that upon release of pressure by the operator, the parts will be moved back to such a position that the fluid pressure in the cylinder chambers 127 and 128 will be placed in equilibrium.

Another feature of the invention which is particularly useful in connection with aircraft is that utilization of pressure fluid, such as from the pump 180, effects a very efficient and desirable elimination of air from the entire system where liquid is used as the operating fluid. This is of great importance in aircraft in which the elimination of air from fluid systems in hydraulic actuating devices has caused considerable difficulty due to the frequently inverted position of the aircraft, the change of altitude, etc.

*Two-Stage Manual Operation of Two-Way Actuator*

As in the case previously described in connection with the one-way actuator, likewise in the two-way actuator, two-stage manual operation may be readily provided, where desired, by insertion of staging valves between the respective pistons 138—122 and 138'—122. In Fig. 6, I have shown such a modification in which staging valves are constructed and operate in a manner similar to that previously described with reference to Fig. 3. Only such parts of the device have been shown in Fig. 6 as necessary to a complete understanding of the modification therein disclosed, and such parts as correspond to the parts of Fig. 4 are designated by the same reference numerals to which have been added the suffix $a$. For example in Fig. 6, the piston 122a, provided with respectively opposite heads 123a and 124a, is disposed within a cylinder 115a and the small pistons 138a and 138'a have the same relationship and operate in the same manner as previously described in connection with Fig. 4. For purposes of simplification, the staging valve will be described with particularity with reference to the piston 138a; it being understood that similar parts shown in Fig. 6 with reference to piston 138'a are similarly constructed and arranged for similar operation.

A pin 200 is provided with an enlarged bore 201 held in engagement against the end of cylinder 140a by means of a helical spring 202 whose other end engages the inner end of piston 138a. The intermediate portion of pin 200 is in sealing engagement with an axial bore 203 provided in the piston 138a, as by means of a sealing ring 204, and said bore forms a continuation of the bore in which the valve 122a is slidably positioned. The pin is provided with an outer end 205 which is slightly spaced from the adjacent end of the valve member 152a and the helical spring 206 surrounds the end 205 and serves to resiliently hold the valve member 152a in spaced position relative to said pin. It will thus be seen that upon the inward movement of the piston 138a, the valve 152a is positively moved to the left to thereby lift the valve member 151a from its seat in the same manner as the valve member 152 of Fig. 4 was positively moved by engagement with the end of the cylinder 140 to raise the valve member 151.

The pin is also provided with a central bore 207 whose outer end is provided with ports 208 communicating with the bore 203 which is also in communication through the ports 149a with the bore 142a, which in turn is in communication with the cylinder chamber 127a by way of the passage 148a. The bore 207 is provided with a port 209 which is in communication with the cylinder 140a and the passage through this port is controlled by a valve 210 which is provided with an actuating head 211 disposed in a bore 212 in which it is sealed by a suitable ring, such as 213, so as to provide a fluid chamber which communicates through a port 214 with the cylinder 140a. The integrally formed valve 210 and plunger 211 are normally held in the position shown in the drawing by means of a helical spring 215. The bore 212 is vented to the annular space 147a by means of ports 216 and 217 which are sealed from the cylinder 140a by a suitable sealing ring 218.

It will therefore be seen that as the piston 138a starts its movement, the valve ring 143a seats against its cooperating seat and thereafter fluid in cylinder 140a is trapped between the piston 138a and the piston 122a causing a positive driving connection therebetween. As soon as this pressure reaches a predetermined value to overcome the spring 215, it acts upon the head 211 to thereby open the valve 209—210 and permit the fluid to be displaced from the cylinder 140a through the bore 207, the ports 208, the bore 203, the port 149a, the passages 142a and 148a into the cylinder chamber 127a, to thereby exert compound hydraulic pressure on the piston 122a in what is termed the second stage of manual operation. As soon as this stage has progressed to a point where the pin end 205 acts through the valve member 152a to raise the valve member 151a from its seat, the fluid under pressure is admitted in the manner previously described in connection with Fig. 4 and the device is then under power operation due to the introduction of fluid under pressure into the cylinder chamber 127a in the manner previously described in connection with Fig. 4. The parts are successively returned to their normal position indicated in the drawing, in the manner similar to that previously described with reference to Fig. 3. Similarly, the corresponding parts of the opposite piston 138'a serve to provide a like two-stage manual operation followed by a power stage of operation, and therefore need not be described in further detail.

It is within the contemplation of the invention that two one-way units, such as disclosed in Fig. 1, may likewise be employed in two-way actuation. This may be accomplished either through fluid lines to the outlets, such as 3, or by direct mechanical connections with the actuated members 4. In either case, the operative ends 30 may be attached on opposite sides of a two-way control lever or other suitable manually movable part.

Further, the two-way device of Fig. 4, instead of being mechanically connected to the unit to be actuated (as by the piston rod 129), may be connected readily by a fluid drive connection. For example, the piston rod 129 may drive a two-way fluid-displacing piston disposed in a cylinder whose opposite ends may be placed in communication with fluid motors provided for alternative actuation by respectively opposite movement of the piston 122. That is, the same principle as applied in Figs. 1 and 2 for actuating units by means of fluid driving connections may be applied in the two-way device. Also, if desired, the cylinder chambers 127—128 may be tapped for supplying actuating fluid pressure to auxiliary units in a manner similar to that described relative to Figs. 1 and 2.

Having thus described my invention with particularity with reference to preferred forms, and having described and referred to certain modifications, it will be obvious to those skilled in the art, after understanding my invention, that various changes and other modifications may be made therein without departing from the spirit and scope of my invention, and I aim in the appended claims to cover such changes and modifications as are within the scope of the invention.

What I claim is:

1. In a power-operated hydraulic actuator, the combination of a cylinder, a piston in said cylinder, a plunger having an end slidably disposed within a bore in said piston and movable relative to said piston, means for moving said plunger, said plunger being provided with a hydraulic fluid passage in communication adjacent its forward end with said cylinder and an opening adjacent its rearward end for communication with a hydraulic fluid pressure line, a metering valve disposed in said passage and carried by said plunger and bodily movable therewith, and means carried by said piston and relatively movable with respect to said plunger for opening said metering valve, a separately operable annular exhaust valve for said cylinder, said exhaust valve surrounding said plunger and providing for inward movement of said plunger therethrough when said valve is in closed position and being drivingly connected to said plunger for movement thereby to open position by outward movement of said plunger, whereby upon predetermined relative movement of said plunger inwardly said exhaust valve is released for movement to closed position and said hydraulic pressure fluid is metered into said cylinder in accordance with the movement of said plunger and said piston is driven by said hydraulic pressure fluid in accordance with the relative forward movement of said plunger.

2. In a power-operated hydraulic actuator, the combination of a cylinder, a piston in said cylinder, a plunger having an end slidably disposed within a bore in said piston and movable relative to said piston, means for manually moving said plunger, means drivingly connecting said piston and plunger and yieldable at a predetermined pressure, said plunger being provided with a hydraulic fluid passage in communication adjacent its forward end with said cylinder and an opening adjacent its rearward end for communication with a hydraulic fluid pressure line, a metering valve disposed in said passage and carried by said plunger and bodily movable therewith, and means carried by said piston and relatively movable with respect to said plunger, upon the relative movement of said plunger and piston after said driving connection has yielded, for opening said metering valve, a separately operable annular exhaust valve for said cylinder, said exhaust valve surrounding said plunger and providing for inward movement of said plunger therethrough when said valve is in closed position and being drivingly connected to said plunger for movement thereby to open position by outward movement of said plunger, whereby upon initial actuation of said plunger said piston is manually moved and upon predetermined relative movement of said plunger inwardly said exhaust valve is released for movement to closed position and said hydraulic pressure fluid is metered into said cylinder in accordance with the movement of said plunger and said piston is driven by said hydraulic pressure fluid in accordance with the relative forward movement of said plunger.

3. In a compound hydraulic pressure device, the combination of a relatively large piston operatively disposed in a corresponding cylinder and providing therewith a first power chamber, a relatively small piston operatively disposed in a corresponding cylinder provided in said large piston and providing therewith a second power chamber, means for moving said small piston, means of communication between said power chambers whereby said large piston is movable by fluid displaced by the movement of said small piston, conduit means in communication with said first power chamber, and valve means operable by a predetermined movement of said small piston relative to said large piston for admitting supplemental fluid under pressure to said first power chamber.

4. In a compound hydraulic pressure device, the combination of a large piston operatively disposed in a corresponding cylinder and providing therewith a first power chamber, a manually movable small piston operatively disposed in a corresponding cylinder provided in said large piston and providing therewith a second power chamber, means of communication between said power chambers whereby said large piston is movable by fluid displaced by the movement of said small piston, conduit means in communication with said first power chamber, and valve means operable by predetermined movement of said small piston relative to said large piston for admitting supplemental fluid under pressure to said first power chamber, said valve means comprising a valve body movable with said small piston and mechanical means disposed between said pistons for opening said valve.

5. In a compound hydraulic pressure device the combination of a piston rod having a small piston operatively disposed within a corresponding cylinder, a relatively large piston operatively disposed within a corresponding cylinder, a common housing within which said large and small cylinders and pistons are disposed in axial alignment, means for relatively moving said small piston to displace fluid within said housing and against said large piston to thereby move said large piston under hydraulic advantage, a conduit including a longitudinally extending passage within said small piston rod for supplying supplemental hydraulic fluid under pressure into said large cylinder in the direction of movement of said large piston, and valve means apart from said housing operable by the differential of movement between said large and small pistons for controlling the flow of said supplemental hydraulic fluid through said longitudinally extending passage and into said large cylinder, said parts being so constructed and arranged that throughout the operative range of the power stroke the forward movement of said small piston relative to said large piston imposes an hydraulic advantage by the displacement of fluid in said large cylinder in addition to the supplemental hydraulic fluid under pressure introduced into said large cylinder.

6. In a compound hydraulic pressure device, the combination of a relatively large piston operatively disposed within a corresponding cylinder, said piston having a bore extending inwardly from one end, a relatively small piston operatively disposed within said bore as a cylinder, means for moving said small piston within the bore of said large cylinder to displace hydraulic fluid therefrom, means for passing said displaced hydraulic fluid into said large cylinder to the rear of said large piston for moving said large piston forwardly under hydraulic advantage, means for supplying supplemental hydraulic fluid under pressure within said large cylinder to the rear of said large piston, and valve means for controlling the flow of said supplemental hydraulic fluid into said large cylinder, said valve means being operable by the displacement stroke of said small piston.

7. In a compound hydraulic pressure device, the combination of a small piston operatively disposed within a corresponding cylinder, a relatively large piston operatively disposed within a corresponding cylinder, means for moving said small piston within its corresponding cylinder to displace fluid therefrom, means for passing said displaced fluid into said large cylinder for moving said large piston, conduit means for supplying supplemental hydraulic fluid under pressure within said large cylinder in the direction of movement of said large piston and into said small cylinder in opposition to the displacement stroke of said small piston, valve means for controlling the flow of said supplemental hydraulic fluid through said conduit means, said valve means being operable by the displacement stroke of said small piston, and second valve means for controlling the flow of hydraulic fluid from said small cylinder rearwardly through said conduit means, said second valve means being normally open and operable to closed position in the event of failure of said supplemental hydraulic fluid pressure.

8. In a compound hydraulic pressure device, the combination of a small piston operatively disposed within a corresponding cylinder, a relatively large piston operatively disposed within a corresponding cylinder, means for moving said small piston within its corresponding cylinder to displace fluid therefrom, means for passing said displaced fluid into said large cylinder for moving said large piston, conduit means for supplying supplemental hydraulic fluid under pressure within said large cylinder in the direction of movement of said large piston and into said small cylinder in opposition to the displacement stroke of said small piston, valve means for controlling the flow of said supplemental hydraulic fluid through said conduit means, said valve means being operable by the displacement stroke of said small piston, and second valve means for controlling the flow of hydraulic fluid from said small cylinder rearwardly through said conduit means, said second valve means being constructed and arranged to pass fluid through said conduit means into said small cylinder and to prevent the passage of fluid from said small cylinder outwardly through said conduit means.

9. In a compound two-stage hydraulic pressure device, the combination of a small piston telescopically disposed within a relatively large piston to provide a small cylinder chamber, a cooperating cylinder within which said large cylinder is disposed to provide a large piston chamber, means for manually moving said small piston, a fluid staging valve interposed in a hydraulic fluid passage between said chambers for causing unitary movement of said pistons during a first stage and compound movement during a second stage, conduit means in communication with said large cylinder chamber for introducing hydraulic fluid under pressure in metered volume to actuate said large piston, and metering valve means in said conduit operable by the movement of said small piston during said second stage to open said valve for the passage of said hydraulic fluid under pressure to the rear of said large piston, said conduit being in operative communication with said small cylinder chamber for exerting a reactionary force upon said small piston in a reverse direction, whereby the actuation of said large piston by said hydraulic pressure fluid continues only during manual application.

10. In a power-operated hydraulic actuator, the combination of a hydraulic cylinder, a piston operatively disposed therein, conduit means for conveying operating hydraulic fluid from an external power pressure source into said cylinder for actuation of said piston, manual actuating means movable with and with respect to said piston, means for hydraulically connecting said actuating means and said piston during the operative movement of said piston including first valve means operable to closed or open position for effecting and releasing said hydraulic connection, second valve means disposed in said conduit means and mounted for movement with said piston, and means interposed between said piston and actuating means for operating said second valve means upon predetermined relative movement of said piston and actuating means.

11. In a power-operated hydraulic actuator system, the combination of a hydraulic cylinder, a piston operatively disposed therein, hydraulic pressure fluid supply means, conduit means for conveying operating fluid from said pressure fluid supply means into said cylinder for actuation of said piston, manual actuating means movable with and with respect to said piston, means for hydraulically connecting said actuating means and said piston during the operative movement of said piston including first valve means operable to closed or open position for effecting and releasing said hydraulic connection, second valve means disposed in said conduit means mounted for movement with said piston, and means interposed between said piston and actuating means for operating said second valve means upon predetermined relative movement of said piston and actuating means, and return conduit means from said cylinder to said pressure fluid supply means, said first valve controlling the passage of hydraulic fluid from said cylinder to said return conduit.

12. In a hydraulic actuator system, the combination of a hydraulic cylinder, a piston operatively disposed therein, hydraulic pressure fluid supply means, a reservoir in communication with said cylinder and with the intake side of said pressure fluid supply means, conduit means for conveying operating fluid from said pressure fluid supply means into said cylinder for actuation of said piston, manual actuating means movable with and with respect to said piston, hydraulic fluid drive means interposed between said manual actuating means and piston whereby said piston is movable under manual force, valve means disposed in said conduit means and mounted for movement with said piston, and means interposed between said piston and actuating means for operating said valve means upon predetermined relative movement of said piston and actuating means during the hydraulic fluid driven movement of said piston.

13. In a compound hydraulic pressure system, the combination of a large piston operatively disposed in a corresponding cylinder and providing therewith a large power chamber, a manually operable small piston telescopically disposed in a cooperating cylinder formed in said large cylinder and providing therewith a small power chamber, said small piston having an axial bore in liquid communication with said small power chamber and with said large power chamber, whereby manual operation of said small piston exerts hydraulic pressure in said large power chamber to thereby impose hydraulic pressure advantage on said large piston in the direction of its forward movement, a power operated pump whose output side is in liquid communication with said bore, valve means in said bore operable by predetermined telescopic movement of said pistons for admitting pressure liquid to said large and small power chambers during said imposition of hydraulic pressure advantage on said large piston by said small piston, means for operatively connecting said large piston to a first device to be actuated, and means for connecting said pressure liquid in said large power chamber to a second device to be operated in synchronism with said first device but separately therefrom.

14. In a hydraulic actuator, the combination of a fluid cylinder, a double acting piston operatively disposed therein, conduit means for conveying operating hydraulic pressure fluid from an external source into said cylinder selectively on respectively opposite ends of said piston for actuation of said piston in relatively opposite directions, manual actuating means selectively movable in relatively opposite directions with and with respect to said piston, means for hydraulically connecting said manual actuating means to said piston during the operative movement of said piston including first valve means for controlling said hydraulic connection, second valve means disposed in said conduit means and mounted for movement with said piston, and means interposed between said piston and actuating means for selectively operating said second valve means for selectively controlling the flow of hydraulic fluid into said cylinder on respectively opposite ends of said piston upon predetermined movement of said actuating means relative to said piston in respectively opposite directions.

15. In a hydraulic power actuator, the combination of a cylinder, a double acting piston operatively disposed in said cylinder and providing therewith oppositely disposed actuating hydraulic chambers, driven means connected to said piston for movement in respectively opposite directions, oppositely disposed plungers yieldably drivingly connected to said piston for actuation thereof in relatively opposite directions, means for rigidly connecting together the outer ends of said plungers for unitary movement and providing a manually operable driving end, hydraulic fluid conduit means for introducing actuating hydraulic fluid from an external hydraulic pressure source into said hydraulic fluid chambers, means for hydraulically connecting said plungers to said piston during the operative movement of said driving end in respectively opposite directions including first valve means for controlling said hydraulic connections, second valve means controlling the flow of hydraulic fluid through said conduit means to respective of said chambers, and valve control means actuated by respectively opposite movement of said driving end for selectively admitting hydraulic fluid into respective of said cylinder chambers.

16. In a hydraulic power actuator, the combination of a cylinder, a double acting piston operatively disposed in said cylinder and providing therewith oppositely disposed actuating hydraulic chambers, driven means connected to said piston for movement in respectively opposite directions, oppositely disposed plungers whose inner ends extend within bores provided in respectively opposite ends of said piston and are yieldably drivingly connected to said piston for actuation thereof in relatively opposite directions, means for rigidly connecting together the outer ends of said plungers for unitary movement and providing a manually operable driving end, hydraulic fluid conduit means for introducing actuating pressure fluid from an external source into said hydraulic chambers, means for hydraulically connecting said plungers to said piston during the operative movement of said driving end in respectively opposite directions including first valve means for controlling said hydraulic connections, second valve means controlling the flow of fluid through said conduit means to respective of said chambers, and valve control means actuated by respectively opposite movement of said plungers relative to said piston for selectively admitting hydraulic fluid into respective of said cylinder chambers.

17. In a hydraulic two-directional actuator, the combination of piston means providing two piston heads, cylinder means providing two cylinder hydraulic chambers respectively cooperating with said piston heads for driving said piston means in relatively opposite directions, a pair of plungers having their inner ends slidably disposed within bores in respectively opposite ends of said piston means and movable relative to said piston means, means for manually moving said plungers in respectively opposite directions, means individually drivingly connecting said piston means and respective plungers for actuation in respectively opposite directions and yieldable at a predetermined pressure, said plungers being provided with respective hydraulic fluid passages in communication adjacent their inner ends with respectively corresponding cylinder chambers and adjacent their respective outer ends having hydraulic fluid inlet openings for communication with a hydraulic pressure line, metering valves disposed respectively in said passages and carried by respective of said plungers and bodily movable therewith, and means carried by said piston means and respectively relatively movable with respect to said plungers upon the relative movement of respective of said plungers and piston means after respective of said driving connections have yielded for opening respective of said metering valves, whereby upon initial inward actuation of respective of said plungers said piston means is manually moved in the corresponding direction and upon predetermined relative movement of respective of said plungers said hydraulic pressure fluid is metered into respective of said cylinder chambers in accordance with the inward movement of respective of said plungers, and said piston means is driven by said hydraulic pressure fluid in accordance with and in the direction of relatively forward movement of respective of said plungers.

18. In a compound fluid pressure device, the combination of a large cylinder, a cooperating piston operatively disposed therein, said large piston having an axial bore providing a small cylinder, a small piston operatively disposed in said small cylinder, a manually operable plunger for moving said small piston, said small piston and plunger having a passage therethrough providing a fluid conduit in communication at one end with said small cylinder and having an outlet opening at its other end for fluid communication with an external fluid pressure means, said conduit being also in communication with said large cylinder, whereby said small and large cylinders are in communication with each other, a first valve movable with said plunger and disposed in said conduit and having a movable valve pin adapted to be held in closed position against its seat by fluid pressure from said pressure line for closing communication from said pressure line to said small and large cylinders, and means for opening said first valve, said last means comprising an axially extending valve actuating pin having one end restricted against movement by the head of said small cylinder and whose other end is yieldably connected to a second movable valve pin spaced therefrom and disposed in said conduit in engagement with said first valve pin, said second valve pin being spaced from a cooperating valve seat so as to provide a second valve in the fluid path between said conduit and said small and large cylinders, said second valve being normally held in open position by said first valve pin under the influence of fluid pressure in said conduit; whereby upon the predetermined forward movement of said small piston said second valve pin is moved into engagement with said actuating pin and said first valve pin is raised from its seat to thereby admit fluid under pressure to said small and large cylinders, and in the event of failure of said external fluid pressure, said second valve pin is moved to closed position by fluid pressure in said small and large cylinders to thereby close the same from said conduit to maintain manual operative pressure within said small and large cylinders.

19. In a compound hydraulic pressure device, the combination of a relatively large piston operatively disposed within a corresponding cylinder and providing therewith a large power chamber, said piston having a bore extending from one end, a relatively small piston operatively disposed within said bore as a cylinder and providing therewith a small power chamber, a ring valve within said large chamber and surrounding said small piston and providing means for venting said large power chamber, said small piston being provided with means to move said valve to open position when said piston is in its outward position and being slidable axially through said valve during its inward stroke, means for moving said small piston within the bore of said large cylinder to release said valve for closing said large chamber and to displace fluid from said small chamber, means for passing said displaced fluid into said large chamber for moving said large piston forwardly, means for supplying supplemental hydraulic fluid under pressure within said large chamber, and valve means having a valve area substantially smaller than the valve area of said ring valve for controlling the flow of said supplemental hydraulic fluid into said large chamber, said last mentioned valve means being operable by the displacement stroke of said small piston.

MARTIN V. GROVES.

REFERENCES CITED

The following references are of record in the file of this patent:

UNITED STATES PATENTS

| Number | Name | Date |
|---|---|---|
| 1,582,118 | Bragg | Apr. 27, 1926 |
| 1,679,762 | Bragg | Aug. 7, 1928 |
| 1,831,737 | Broussouse | Nov. 10, 1931 |
| 1,848,923 | Almen | Mar. 8, 1932 |
| 2,012,861 | Woolson | Aug. 27, 1935 |
| 2,064,379 | Kundig | Dec. 15, 1936 |
| 2,136,318 | Rossmann | Nov. 8, 1938 |
| 2,185,449 | Veenschoten | Jan. 2, 1940 |
| 2,331,238 | Schnell | Oct. 5, 1943 |
| 2,345,531 | De Ganahl | Mar. 28, 1944 |
| 2,380,705 | Proctor | July 31, 1945 |
| 2,389,274 | Pearsall | Nov. 20, 1945 |

FOREIGN PATENTS

| Number | Country | Date |
|---|---|---|
| 668,288 | France | July 9, 1929 |
| 747,273 | France | Mar. 28, 1933 |
| 777,932 | France | Dec. 15, 1934 |

Certificate of Correction

Patent No. 2,451,334.  October 12, 1948.

MARTIN V. GROVES

It is hereby certified that errors appear in the printed specification of the above numbered patent requiring correction as follows:

Column 3, line 52, for "look" read *lock*; line 59, after the word "serves" strike out the article "a" first occurrence; column 4, line 51, for "spaced in" read *spaced a*; column 7, line 53, strike out "the" first occurrence; column 18, line 45, for "cylinder" second occurrence read *piston*; line 47, before "fluid" insert *hydraulic*; column 19, line 22, before "mounted" insert *and*;

and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.*